April 16, 1963   B. L. D'ACHILLE   3,085,605
VEGETABLE PEELING AND SLICING APPARATUS
Filed March 7, 1960   4 Sheets-Sheet 1

Bernardo L. D'Achille
INVENTOR.

BY *Clarence A. O'Brien*
*and Harvey B. Jacobson*
Attorneys

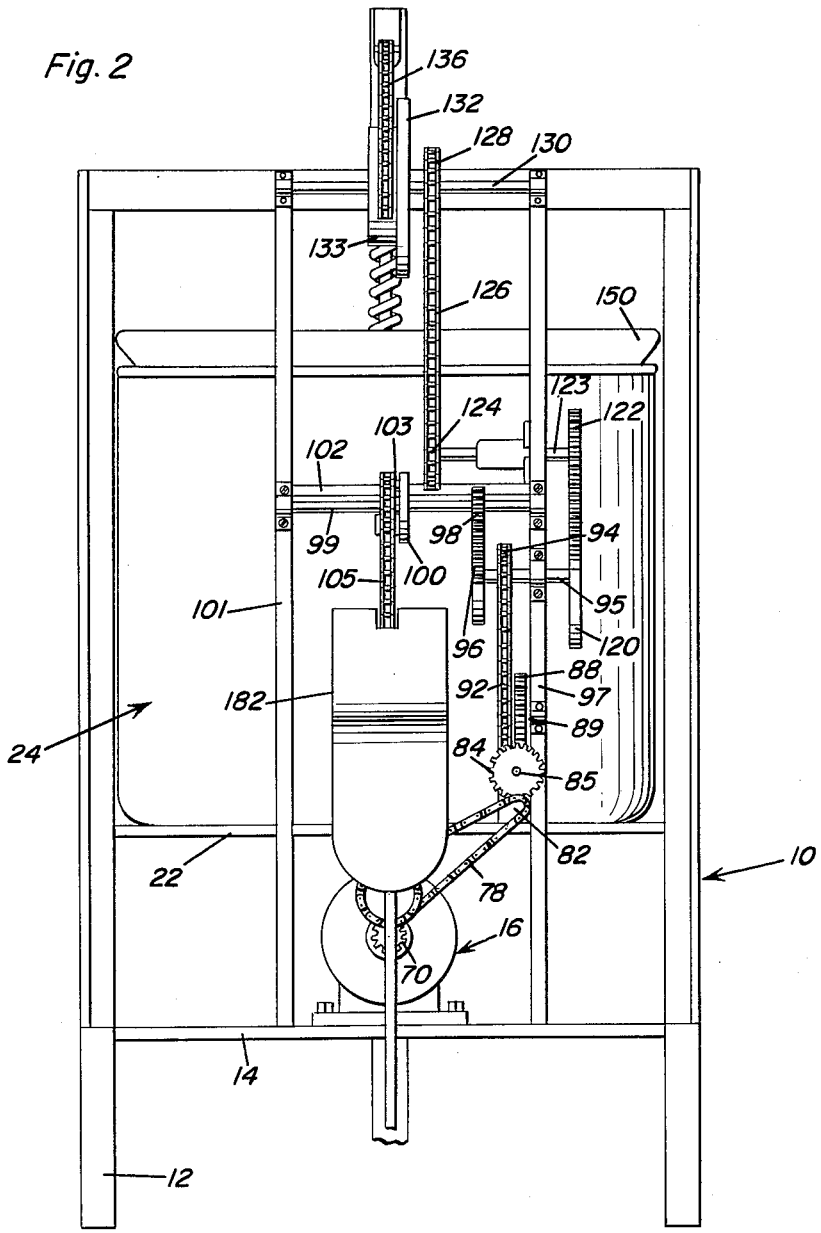

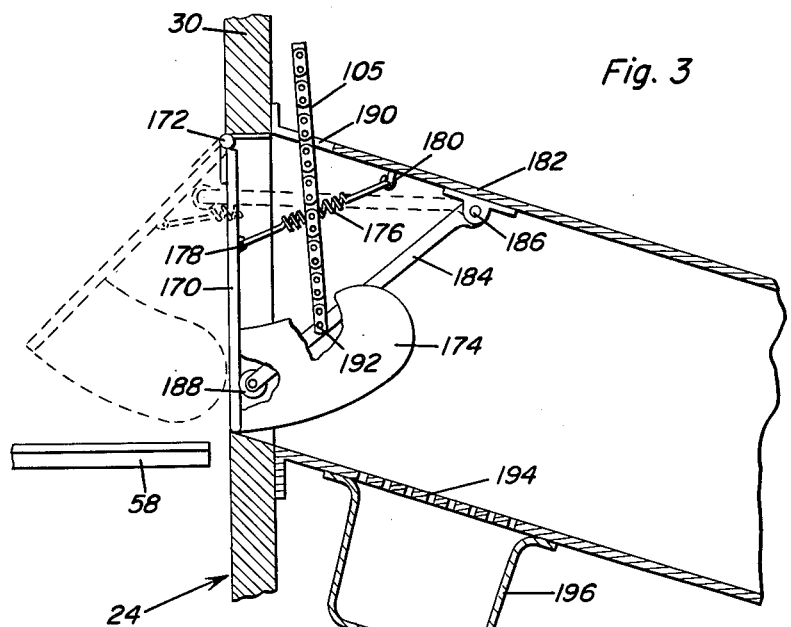
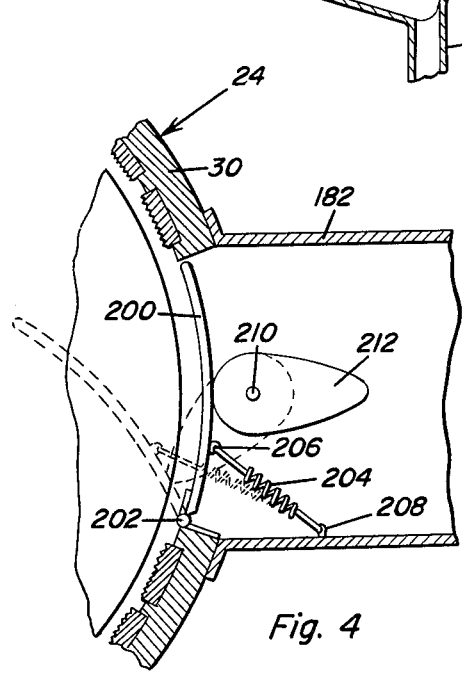
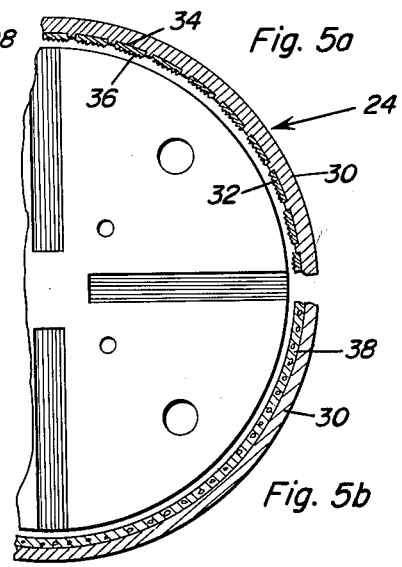
Bernardo L. D'Achille
INVENTOR.

April 16, 1963  B. L. D'ACHILLE  3,085,605
VEGETABLE PEELING AND SLICING APPARATUS
Filed March 7, 1960  4 Sheets-Sheet 4
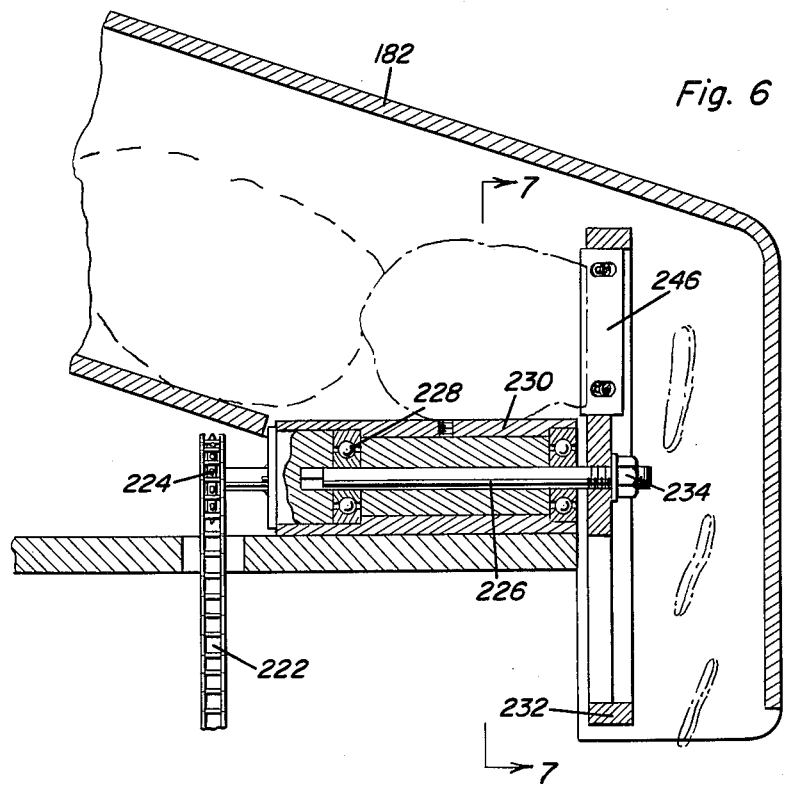
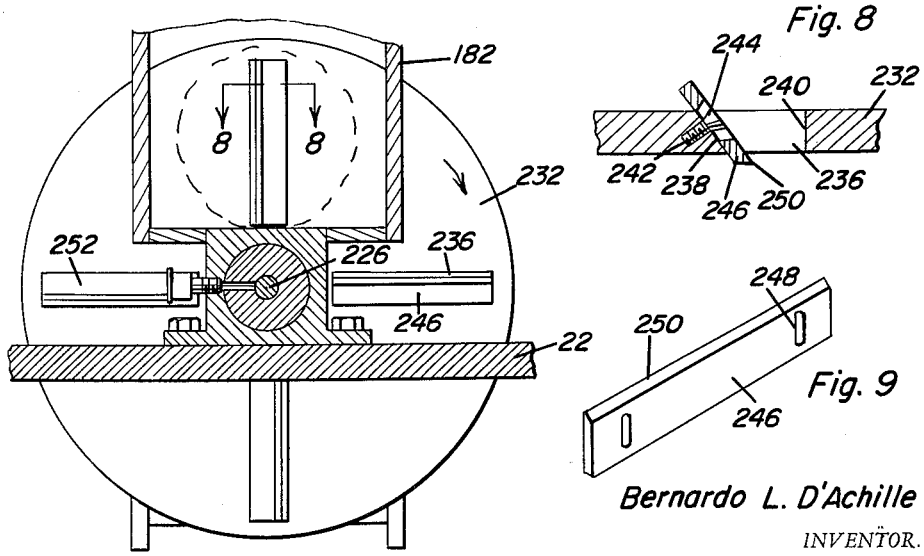
Bernardo L. D'Achille
INVENTOR.

United States Patent Office 3,085,605
Patented Apr. 16, 1963

3,085,605
VEGETABLE PEELING AND SLICING APPARATUS
Bernardo L. D'Achille, 1249 5th Ave.,
New Kensington, Pa.
Filed Mar. 7, 1960, Ser. No. 13,335
12 Claims. (Cl. 146—49)

This invention relates generally to equipment for preparing raw vegetables, and more particularly to a device for automatically and continually peeling, washing, and/or slicing vegetables.

In recent years, many devices have become available for washing and peeling vegetables, principally potatoes. Some of these devices have included as a portion thereof slicing means. Devices of this sort are extremely useful in large restaurants and dining halls and also for mass food processing purposes, as in the preparation of potato chips, frozen French fried potatoes, etc. Ordinarily, washing and peeling devices are characterized by a tub provided with an abrasive surface therein and means for effecting the rapid rotation of vegetables relative to the abrasive surface whereby the vegetable skins may be rubbed therefrom. Generally, a water inlet is provided for washing the vegetables as they are being peeled. A drain, of course, is provided for draining the water therefrom. The general operational procedure of these devices is to initiate the rotation of a rotatable member within the tub and to then deposit the vegetables within the tub whereby they will be thrown against the abrasive tub wall for peeling. The water is preferably continually run as the vegetables are peeled so as to wash the peelings from the vegetables. The operator of the device watches the vegetables and when it is felt that they are adequately peeled, the rotatable member may be stopped and the vegetables removed. If the operator is inattentive, excessive rotation of the rotatable member will cause the vegetables to rub against the abrasive wall subsequent to the completion of the removal of the vegetable skins. The continued abrasion will of course continue to reduce the size of the vegetables. It is therefore apparent that unless extreme care is exercised in the operation of the device, considerable quantities of vegetables will be wasted. In view of this, it is the principal object of this invention to provide a novel vegetable peeling and slicing apparatus which includes means for automatically admitting and discharging the vegetables therefrom so as to assure no excessive peeling of the vegetables, thereby minimizing vegetable waste.

It is a more particular object of this invention to provide novel apparatus for peeling and slicing vegetables which includes timing means for automatically and alternately actuating entrance means for admitting vegetables to the apparatus and exit means for discharging vegetables therefrom. The timer mechanism not only controls the duration of the vegetable admission and discharge periods, but also controls the frequency of repetition of the respective periods. Accordingly, there is little likelihood of the vegetables being peeled excessively.

It is a still further object of this invention to provide novel apparatus for peeling and slicing vegetables which includes adjustable and automatic means for controlling the duration and frequency of the periods of admission and discharge of the vegetables to the peeling apparatus. The peeling apparatus makes use of a substantially cylindrical tub having an abrasive inner surface. A rotatable tray is disposed within the tub for providing relative rotational motion between the vegetables and the abrasive surface. The abrasive surface includes abrasive inserts removably received in recesses defined in the tub wall.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an elevational end view of the apparatus;

FIGURE 3 is an enlarged fragmentary sectional view illustrating the detail of the exit means for permitting the discharge of the vegetables from the peeling apparatus to the slicing means;

FIGURE 4 is a fragmentary sectional view illustrating an alternative form of discharge means;

FIGURES 5a and 5b are fragmentary sectional views of the tub showing, respectively, alternative abrasive inner surface arrangements;

FIGURE 6 is a fragmentary sectional view of the slicing means;

FIGURE 7 is an enlarged sectional view taken substantially along the plane 7—7 of FIGURE 6 and illustrating particularly the slicing means;

FIGURE 8 is an enlarged sectional view taken substantially along the plane 8—8 of FIGURE 7 and illustrating blades adjustably carried by a rotatable disk; and FIGURE 9 is an enlarged perspective view of one of the blades.

Figure 1:
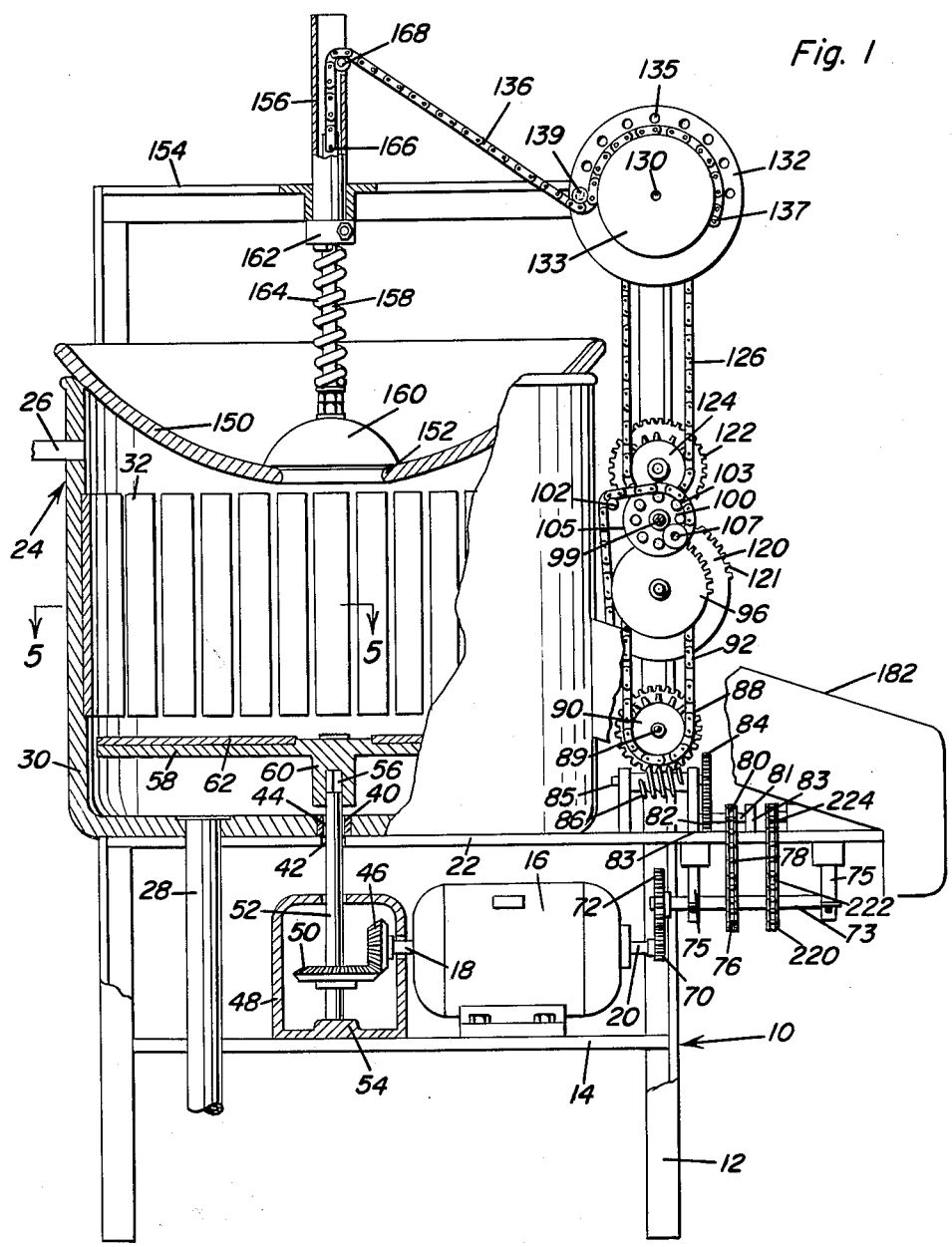
FIGURE 1 is an elevational side view with parts broken away and/or shown in section illustrating the vegetable peeling and slicing apparatus comprising this invention.

With continuing reference to the drawings and initial reference to FIGURES 1 and 2, numeral 10 generally represents a support structure including depending legs 12 adapted to engage a floor surface. The support structure 10 is provided with a shelf 14 to which is bolted motor 16 having a drive shaft with projecting drive ends 18 and 20.

A second shelf 22 supports a cylindrical tub 24 thereon. The tub 24 is provided with a water inlet pipe 26 disposed adjacent the top thereof, and a water drain pipe 28 at the bottom thereof. The tub 24 includes a vertical wall 30 internally mounting an abrasive inner surface which may be of any form and defining a food receiving chamber. However, particular attention is called momentarily to FIGURES 5a and 5b wherein a pair of suggested constructions are illustrated. In 5a, bar inserts 32 are secured within recesses 34 formed in the wall 30. The bar inserts 32 are serrated as at 36 for establishing a good abrasive surface. The inserts 32 are removable so that when a particular insert loses its abrasive qualities, it may be easily removed from the recess 34 and replaced. The composition of the inserts 32 may be of metal, concrete, or such. In 5b, an alternative construction is illustrated wherein a concrete liner 38 provides an abrasive inner surface for the wall 30. Other types of abrasive inner surfaces may be utilized if desired.

Registered openings 40 and 42 are defined in the tub and shelf 22 respectively. A bearing 44 is disposed in the opening 40 and water seal means are mounted adjacent thereto for preventing water from leaking therethrough.

The end 18 of the drive shaft of motor 16 is provided with a bevel gear 46 disposed in housing 48. The bevel gear 46 drives bevel gear 50 secured to drive spindle 52 mounted for rotation in boss 54 of housing 48. The drive spindle 52 extends from the housing 48, through the bearing 44 and terminates in a square end 56. A tray 58 has a hub 60 defining a square aperture receiving square end 56 of drive spindle 52. The tray 58 has a diameter slightly smaller than the diameter of the tub 24. The tray 58 is provided with an abrasive upper surface, which may, for instance, be in the form of abrasive inserts 62, similar to abrasive inserts 32. The vegetables may accordingly be processed in response to rotation of the tray 58.

A second drive end 20 of the drive shaft of motor 16 has a gear 70 secured thereto engaged with a gear 72 secured to shaft 73 rotatably journaled in bearings carried by supports 75 depending from shelf 22. A sprocket gear 76 is secured to shaft 73 and drives a gear 80 on rotatably journaled shaft 81 through sprocket chain 78. The shaft 81 is rotatably journaled in support 83. A gear 82 is also secured to shaft 81 and drives gear 84 on shaft 85 having worm gear 86 secured thereto. The worm gear 86 is meshed with worm wheel 88 secured to shaft 89. A sprocket gear 90 is also secured to shaft 89 and drives sprocket chain 92 to in turn drive sprocket gear 94 secured to shaft 95 rotatably journaled in support 97.

A sector tooth timing gear 96 is secured to a first end of the shaft 95 and intermittently drives gear 98 secured to shaft 99 rotatably journaled between supports 97 and 101. A disk 100 is secured to shaft 99 and is provided with a plurality of pins 103 projecting from the face thereof. A sprocket chain 105 is secured to disk 100 and wheel 107 and passes around projections 103 as particularly indicated in FIGURES 1 and 2. The chain 105 further passes around shaft 102 rotatably journaled between supports 97 and 101. The chain 105 controls the tub exit means and will be more particularly described hereafter.

A timing gear 120 is secured to a second end of shaft 95 and drives gear 122 secured to shaft 123 rotatably journaled in support 97. The shaft 123 drives sprocket gear 124 which in turn drives sprocket gear 128 secured to shaft 130, through chain 126. A disk 132 is secured to shaft 130 and is provided with an inner hub 133. Pins 135 on disk 132 are spaced from the hub 133 and a sprocket chain 136 is disposed therebetween. The end of the sprocket chain 136 is secured to hub 133 at 137. The sprocket chain 136 passes between the pins 135 and hub 133 from the securing point 137 and around a rotatably mounted wheel 139. The sprocket chain 136 controls entrance means for controlling the admission of vegetables into the tub 24 and will be more specifically described hereafter.

A bowl 150 having an opening 152 rests on the top of the tub 30 as particularly indicated in FIGURE 1. The support structure 10 extends above the tub 30 as at 154 and is provided with a cylinder 156 within which is slidably disposed a rod 158. Terminally secured to the end of the rod 158 in alinement with the bowl opening 152, is an intermittently operated closure member 160. The rod 158 extends through a collar 162 and a coil spring 164 is received on the rod 158 between the collar 162 and closure member 160. The spring 164 normally urges the closure member 160 into engagement with the bowl 150 for blocking access to the bowl opening 152. The rod 158 extends upwardly through the cylinder 152 and is terminally secured to the sprocket chain 136 at point 166. The sprocket chain 136 extends about a rotatable wheel 168 carried by the cylinder 156. It will therefore be apparent that the gear movements set in motion by motor 16 will cause the closure member 160 to move out of blocking position with respect to opening 152, when the chain 136 pulls the rod 158 upwardly through the cylinder 156 when disk 132 is rotated. It is to be noted that timing gear 120 is provided with teeth 121 on only a particular portion of the circumference thereof. Accordingly, although sprocket chain 92 may continually rotate gear 94 and shaft 95, gear 122 is only engaged with gear 120 for a particular portion of the cycle of gear 120. Therefore, it will be appreciated that the duration and frequency of the rotation of gear 122 for controlling the chain 136 will depend on the portion of the circumference of gear 120 which is provided with teeth 121. The admission of vegetables into the tub may therefore be properly metered.

Exit means are provided in conjunction with the tub 24 and may take either of the forms illustrated in FIGURES 3 and 4. In FIGURE 3, a periodically opened door 170 is hinged about a horizontal axis 172 adjacent an opening formed in the tub wall 30. A projecting arm 174 is secured to the door 170 adjacent the bottom thereof. A spring 176 is secured between an eye 178 on the door 170 and an eye 180 secured to a chute 182 in alinement with the door 170. A rod 184 is pivoted at 186 to the chute 182 and carries a wheel 188 which rides against the door 170. The chain 105 previously referred to, passes through an opening 190 in the chute 182 and is terminally and intermediately secured to the rod 184 at point 192. Accordingly, as the chain 105 is pulled by disk 100 secured to wheel 107 about shaft 102, the rod 184 will be pivoted about point 186 so as to cause the wheel 188 to move upwardly to the dotted position illustrated in FIGURE 3 and carry the door 170 and arm 174 to the dotted position illustrated.

FIGURE 3 is to be further noted for the portion illustrating a perforated floor 194 below which is disposed a pan 196 having a drain pipe 198 secured thereto.

FIGURE 4 illustrates an alternative form of exit means wherein a door 200 is hinged about a vertical axis 202 with a spring 204 being provided between an eye 206 on the door 200 and an eye 208 on the chute 182. In lieu of the chain 105 which pulls the rod 184 in FIGURE 3, the timing gear 96 may be utilized to turn a shaft 210 having a cam 212 secured thereto. The cam 212 may be turned to bear against the door 200 as illustrated in dotted line position for communicating the chute 182 with the interior of the tub 24.

The shaft 73 further supports a sprocket gear 220 driving a chain 222 engaged with sprocket gear 224. Attention is particularly called to FIGURES 6 through 9. Gear 224 in turn rotates spindle 226 mounted in ball bearings 228 in housing 230. A disk 232 is secured to the spindle 226 by nut 234. The disk 232 is provided with four radial slots 236 with the slots being defined by a beveled surface 238 and a square surface 240 or the radial sides of the slots. Threaded bores 242 are defined in the beveled surface 238 for receiving screw fasteners 244. Cutting blades 246 having slots 248 defined therein are secured to the beveled surface 238 by screw fasteners 244. It will be apparent that the blades 246 having a cutting edge 250 thereon may be moved along the beveled surface 238 and stopped in position by screw fasteners 244 so as to enable a particular portion of the cutting edge 250 to be exposed beyond the disk 232. Of course, it will be realized that the variation in exposed cutting surface will allow for the variation in thickness of slices cut from raw vegetables discharged through the chute 182. It is to be noted that a grease fitting 252 extends through the housing 230 and to the spindle 226 for assuring friction free operation thereof.

It is thought that the details of construction of the invention should now be well understood. Accordingly, the sequence of machine operation will now be discussed. As noted in the objects of the invention, the device herein was devised for the purpose of peeling, washing, and slicing vegetables in one continuous operation. It is to be realized that if it is not desired to slice the vegetables, the disk 232 may be removed from the chute 182 by removal of nut 234 from spindle 226. By applying electric power to the motor 16, the sequential operation of the device is assured. The gear train continually revolves and as noted, alternately the closure member 160 is lifted from the bowl 150 to provide access to the tub through opening 152, and the door 170 is opened for providing access from the tub 24 to the chute 182. It is to be appreciated that due to the particular gearing arrangement, the closure member 160 cannot be lifted from the bowl 150 when the door 170 is open because of the staggered operational phase relationship between the opening of the closure member and door. Raw vegetables are deposited in the bowl 150. According to a certain predetermined frequency, the closure member 160 lifts upwardly and the vegetables or a portion of the vegetables in bowl 150 fall into the tub 24 having rotational motion imparted thereto by the movement of the tray 58. The vegetables are washed by water entering the tub through inlet 26 and the vegetables are peeled by engaging the abrasive surfaces of the tub 24 and tray 58. During the washing and peeling stage, both the closure member 160 and door 170 assure that the tub 24 is completely closed. After a predetermined duration of the washing and peeling cycle, the door 170 is opened to allow the vegetables to be discharged through the chute 182. The arm 174 secured to the door 170 directs the rotating vegetables along the chute 182. Excess water is drained from the vegetables through the pan 196. If the disk 232 is carried by the spindle 226, the vegetables will be sliced, as illustrated in dotted lines in FIGURE 6. As noted, the particular positions of the adjustable blade will determine the thickness of the vegetable slices. The door 170 remains open for a predetermined duration and immediately after the closing thereof, the closure member 160 is again lifted upwardly to allow the admission of vegetables from the bowl 150 to the tub 24.

It will be realized that the operation of the invention is therefore continuous and automatic. The particular advantage of the invention over known devices lies in the fact that an operator is not needed to continually monitor the operation of the device and there is no possibility of excessive peeling.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for preparing raw vegetables comprising a support structure, a stationary tub defining a perimeter wall carried by said support structure, metering entrance means on said tub for admitting vegetables thereto, exit means on said tub for discharging vegetables therefrom, said tub being provided with an abrasive inner surface, and rotatable means mounted within said tub for causing relative rotational motion between vegetables in said tub and said abrasive surface, and automatic means operatively connecting said entrance means to said exit means for cyclically admitting and discharging vegetables in spaced phase relation from said tub in response to rotation of the rotatable means.

2. The combination of claim 1 wherein, said automatic means includes a timer mechanism, controlling the duration and frequency of the vegetable admission and discharge periods.

3. The combination of claim 1 wherein, said entrance means includes a reservoir bowl for receiving vegetables and having an opening therein in alinement with said tub and a closure member supported adjacent said opening for normally blocking access through said opening.

4. The combination of claim 1 including, water inlet means supported on said tub wall, and a water drain carried by said tub for draining water therefrom.

5. The combination of claim 4 wherein said automatic means including a timer mechanism, said timer mechanism controlling the duration and frequency of the vegetable admission and discharge periods, and said rotatable means includes a tray disposed in said tub having a vegetable receiving abrasive surface.

6. The combination of claim 5 wherein said entrance means includes a reservoir bowl for receiving vegetables and having an opening in said bowl in alinement with said tub and a closure member supported adjacent said opening for normally blocking access through said opening.

7. Apparatus for preparing raw vegetables comprising a support structure, a tub defining a perimeter wall carried by said support structure, metering entrance means on said tub for admitting vegetables thereto, exit means on said tub for discharging vegetables therefrom, said tub being provided with an abrasive inner surface, and rotatable means mounted within said tub for causing relative rotational motion between vegetables in said tub and said abrasive surface, and automatic means operatively connecting said entrance means to said exit means for repeatedly and alternately admitting and discharging vegetables from said tub in response to rotation of the rotatable means, said automatic means including a timer mechanism controlling the duration and frequency of the vegetable admission and discharge periods and having a pair of continually running timer gears, said timer gears including gear teeth on a portion of the circumference thereof, an operating gear associated with each of said entrance and exit means engageable with one of said timer gears whereby said entrance and exit means will be respectively actuated when said associated operating gears are engaged by said toothed portion of the timer gears.

8. The combination of claim 1 wherein said exit means includes a door pivotally mounted in said tub wall, said door being spring urged closed, a discharge chute in alinement with said door and slicing means mounted in said chute, said slicing means including a rotating disk defining radial slots therein, and adjustable blades secured to the face of said disk proximate said slots.

9. The combination of claim 1 including, water inlet means supported on said tub wall, a water drain carried by said tub for draining water therefrom, and said entrance means including a reservoir bowl having an opening therein in alinement with said tub and a closure member supported adjacent said opening for normally blocking access through said opening, said exit means including a door pivotally mounted in said tub wall, said door being spring urged closed, a discharge chute in alinement with said door and slicing means mounted in said chute, said slicing means including a rotating disk defining radial slots therein, and adjustable blades secured to the face of said disk proximate said slots.

10. Apparatus for continuously processing food material or the like comprising, supporting frame means, material receiving chamber means fixedly mounted on the frame means, metering means mounted on the chamber means for intermittent admission of measured amounts of material thereinto, material processing means movably mounted within the chamber means for continuous processing of material therein, liquid circulating means operatively connected to the chamber means for removal of waste therefrom, periodically operable discharge means operatively connected to the chamber means and the material processing means for discharge of processed material therefrom and drive means operatively connected to the metering means and discharge means for cyclically staggering said admission and discharge of material with respect to the chamber means in response to continuous movement of the material processing means to intermittently process an amount of material predetermined by the speed of the material processing means for a predetermined processing duration prior to discharge.

11. The combination of claim 10 including material slicing means operatively mounted in the discharge means and drivingly connected to the material processing means for operation in time relation thereto.

12. Apparatus for preparing raw vegetables or like material comprising, a support structure, a stationary material receptacle carried by said support structure, metering entrance means on said receptacle for admitting predetermined quantities of material thereinto, exit means on said receptacle for discharging material therefrom in response to movement of the material, abrasive means mounted internally of the receptacle for processing the material, means mounted within said receptacle for causing relative movement between the material and the abrasive means to process the material, timing means continuously operative to control the duration and frequency of material admission and discharge to and from the receptacle and operating means for the exit means and the entrance means drivingly engaged with said timing means for respectively opening said entrance means and said exit means in spaced phase relation to each other to maintain said material within the receptacle for a predetermined processing period.

References Cited in the file of this patent

UNITED STATES PATENTS

| | | |
|---|---|---|
| 845,318 | Redmond | Feb. 26, 1907 |
| 1,749,056 | Albrecht | Mar. 4, 1930 |
| 2,351,995 | Model | June 20, 1944 |
| 2,538,413 | Chard | Jan. 16, 1951 |
| 2,567,248 | Stahmer | Sept. 11, 1951 |
| 2,619,139 | Riggle et al. | Nov. 25, 1952 |
| 2,769,473 | Comber | Nov. 6, 1956 |
| 2,777,158 | Pitts | Jan. 15, 1957 |